United States Patent [19]

Bittner, Jr.

[11] Patent Number: 4,744,936

[45] Date of Patent: May 17, 1988

[54] PROCESS FOR EMBOSSING THERMOPLASTIC MATERIAL

[75] Inventor: John J. Bittner, Jr., Burr Ridge, Ill.

[73] Assignee: Plastic Film Corporation of America, Lemont, Ill.

[21] Appl. No.: 824,218

[22] Filed: Jan. 30, 1986

[51] Int. Cl.⁴ .............................................. B29C 59/04
[52] U.S. Cl. .................................... 264/175; 264/284; 425/335; 425/343
[58] Field of Search ............... 264/175, 284, 293, 167, 264/2.7; 425/335, 343

[56] References Cited

U.S. PATENT DOCUMENTS

| | | |
|---|---|---|
| T868,009 | 11/1969 | Davis et al. |
| 2,318,111 | 5/1943 | Steinberger ........................ 264/284 |
| 2,442,598 | 6/1948 | Harrison et al. ................... 264/284 |
| 2,446,771 | 8/1948 | Knowland .......................... 264/284 |
| 2,928,124 | 3/1960 | Hugger ............................... 264/284 |
| 3,882,207 | 5/1975 | Hannan et al. ...................... 264/1.3 |
| 3,950,480 | 4/1976 | Adams et al. ...................... 264/284 |
| 4,259,285 | 3/1981 | Baumgartl et al. ................ 264/284 |
| 4,379,774 | 4/1983 | Anderson et al. ................. 264/284 |

Primary Examiner—James Lowe
Attorney, Agent, or Firm—Frank J. Uxa

[57] ABSTRACT

A process for embossing both sides of a sheet of thermoplastic material comprises sequentially passing the sheet between two pair of embossing-counter rollers at controlled relative conditions of temperature and pressure.

18 Claims, 1 Drawing Sheet

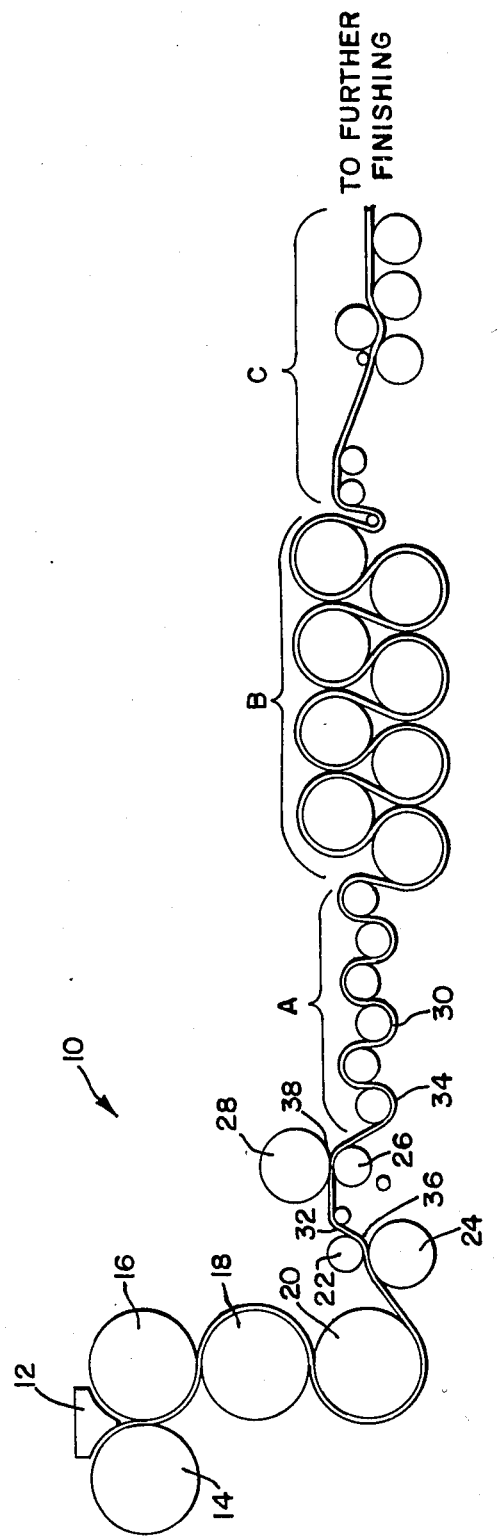

PROCESS FOR EMBOSSING THERMOPLASTIC MATERIAL

BACKGROUND AND SUMMARY OF THE INVENTION

This invention relates to a process for embossing both sides (faces) of a sheet of thermoplastic material. More particularly, this invention relates to an improved process for in-line embossing of both sides of a sheet of thermoplastic material with a minimum of added equipment and cost.

Thermoplastic material, e.g., polyvinyl chloride (PVC) sheeting is produced by calendering or extruding and is sometimes embossed with a leather or other decorative grain or finish. The embossing is conventionally put on one side or face of the sheet of thermoplastic material by using an engraved metal embossing roller. The sheet or film is passed between the engraved roller and a back-up (or counter) non-metal roller and by applying pressure as the sheet passes through. This process permanently places a pattern on the thermoplastic material.

There are certain items in which both sides of the sheet need to be embossed. A number of secondary processes exist for embossing thermoplastic material on both sides. However, these processes add significantly to the cost of the final product and, thus, make the finished product non-competitive. Prior in-line processes call for the use of heated embossing counter rolls, thereby using added, costly energy and increasing the cost of the final product. An improved process for embossing both sides of a sheet of thermoplastic material during the manufacturing operation of such sheet would be clearly advantageous.

A brief prior art search regarding embossing of thermoplastic materials has brought forth the following U.S. Pat. Nos.: 2,318,111; 2,442,598; 2,446,771; 2,928,124; 3,950,480; and 4,259,285; and Defensive Publication No. T868,009.

Therefore, one object of the present invention is to provide an improved process for embossing both sides of a sheet of thermoplastic material.

Another object of the present invention is to provide an improved in-line process for embossing both sides of a sheet of thermoplastic material. Other objects and advantages of the present invention will become apparent hereinafter.

An improved process for embossing both sides of a sheet of thermoplastic material has been discovered. This process is advantageously employed in-line, that is as part of or in conjunction with the process for the manufacture of the thermoplastic material sheeting. In one broad aspect, the present process comprises:

(a) forming an embossable sheet of thermoplastic material at a temperature such that both sides of the sheet are capable of being embossed;

(b) passing the embossable sheet between a first pair of embossing-counter rollers maintained at a first temperature with a first pressure between the first rollers thereby embossing the first side of the embossable sheet; and thereafter (c) passing the embossable sheet between a second pair of embossing-counter rollers maintained at a second temperature with a second pressure between the second rollers thereby embossing the second side of the embossable sheet, provided that the first temperature is greater than the second temperature and the first pressure is less than the second pressure. It is preferred that the conditions at which step (c) is carried out do not undesirably alter the embossing on the first side of the embossable sheet.

By controlling the relative temperatures and pressures of embossing, as described above, both sides of a sheet of thermoplastic material can be effectively embossed to provide a competitive finished product. A minimum of change is required to incorporate the present double embossing process into a conventional calendering operation for the manufacturing of thermoplastic material sheeting. Thus, the present process represents a competitive in-line procedure for embossing both sides of a sheet of thermoplastic material.

The process of the present invention may use any thermoplastic material capable of being formed into thin flexible sheets or webs which are capable of being embossed and retaining an embossed pattern. Among suitable polymers that can be used include: olefin polymers such as polyethylene or polypropylene; styrene polymers; polymers of acrylonitrile/butadiene/styrene (ABS). methylmethacrylate/butadiene/styrene (MBS), methylmethacrylate/ acrylonitrile/butadiene/styrene (MABS); polymers of acrylic or methacrylic acid esters such as polybutylacrylate or polymethylmethacrylate. Polymers derived from vinyl chloride, that is, vinyl chloride homo or copolymers or graft copolymers of vinyl chloride and copolymerizable monomers having at least 50% by weight, relative to the polymer, preferably from 95 to 80% by weight of polymerized vinyl chloride are particularly suitable. Suitable comonomers are for example olefins and diolefins, such as ethylene, propylene, butadiene; vinyl esters of straight-chain or branched carboxylic acids having 2 to 20, preferably from 2 to 4 carbon atoms, such as vinyl acetate, vinyl propionate, vinyl butyrate, vinyl stearate; vinyl or vinylidene halides, such as vinyl fluoride, vinylidene fluoride, vinylidene chloride; vinyl eters; unsaturated acids, such as maleic, fumaric, acrylic and methacrylic acid, and the mono-or di-esters thereof with mono-or di-alcohols having from 1 to 10 carbon atoms; acrylonitrile, styrene or cyclohexyl maleimide. The polymers on the basis of vinyl chloride generally have a K value according to Finkentscher of from 50 to 80, preferably of from 55 to 70.

Alternatively, mixtures of the cited thermoplastics polymers may be used. Preferred are mixtures of vinyl chloride homo-, co- or graft copolymers with so-called resilient resins such as the above ABS, MBS and MABS polymers, or chlorinated polyethylene and, optionally, with so-called processing aids, for example low molecular weight polymethylmethacrylate; the amount of resilient resins and processing aids being preferably from 1 to 15% by weight, relative to the vinyl chloride polymer.

Advantageously, processing additives such as heat and light stabilizers, lubricants, and optionally further special additives such as dyestuffs, pigments, optical brighteners and antistatics are added to the thermoplastic materials. Preferably, polymers having no plasticizer are used; however, the process may also be carried out in the presence of usual amounts of plasticizers.

Suitable heat stabilizers include, for example, mono- and dialkyl-tin compounds, the alkyl groups of which having from 1 to 10 carbon atoms and the remaining valencies of the tin being linked via oxygen and/or sulfur atoms to further substituents; aminocrotonic acid esters; urea and thiourea derivatives; a-phenylindole; salts of alkaline earth metals and of zinc or cadmium with aliphatic carboxylic acids or hydroxycarboxylic acids. Organotin/sulfur stabilizers such as dimethyl-tin-bis-(2-ethylhexylthioglycolate), di-n-butyl-tin-bis-(2-ethylhexylthioglycolate), and di-n-octyl-tin-bis-(2-ethylhexylthioglycolate) are preferably employed. The stabilizers may be used in quantities of from 0.2 to 3% by weight calculated on the thermoplastic material; it is also possible to use them in admixture with one another and with usual co-stabilizers and antioxidants.

Lubricants may also be used, in quantities of from 0.1 to 4% by weight, calculated on the thermoplastic material, such as one or more higher aliphatic carboxylic acids and hydroxycarboxylic acids as well as the esters and amides thereof, such as stearic acid, montanic acid, bis-stearoylethylenediamine or bispalmitoylethylenediamine, montanic acids esters of ethanediol or 1,3-butanediol, optionally partially saponified; fatty alcohols having more than 10 carbon atoms as well as the ethers thereof, low molecular weight polyolefins and hard paraffins.

The thermoplastic materials may contain plasticizers in quantities of from 10 to 40% by weight, calculated on the thermoplastic material, for example, one or more esters of aromatic or aliphatic di-and tri-carboxylic acids, of higher alkylsulfonic acids and of phosphoric acid, such as di-2-ethylhexylphthalate, adipate, or sebacate; alkylsulfonic acid esters of phenol or cresol; tricresyl phosphate or epoxidized soya bean oil or castor oil.

After the double embossing steps described above, it is preferred that the sheet of thermoplastic material from step (c) be further cooled, e.g., on conventional cooling rolls, prior to being sent to further processing and/or product packaging. This added step provides insurance that the embossed finishes on both sides are set.

The present process takes advantage, or makes use of the heat present in the embossable sheet of thermoplastic from step (a). In order to increase the use of this energy, it is preferred that the first and second pair of embossing-counter rollers are located in close proximity (to each other) to minimize the temperature loss of the sheet as it moves from step (b) to (c). Thus, the distance between the point at which the first side of the sheet is embossed, i.e., the first "nip", and the point at which the second side is embossed, i.e., the second "nip" is preferably in the range of about 12 inches to about 50 inches, more preferably about 20 inches to about 30 inches, and still more preferably about 25 inches.

Step (a) preferably comprises passing the thermoplastic material through a series of flat openings between heated rollers. This approach is very convenient for shaping the sheet, as desired, and maintaining the sheet at any appropriate elevated temperature. Other procedures conventionally used for sheets of thermoplastic materials, e.g., such as extrusion, are suitable for forming the embossable sheets used in the present process.

The present process is particularly well suited for use with sheets of vinyl chloride polymer or polyvinyl chloride (PVC). Of course, standard additive components may be present to provide desirable properties to the polymer.

When vinyl chloride polymers are employed, the preferred first temperature is in the range of about 60° C. to about 90° C., more preferably about 70° C. to about 80° C., and still more preferably about 75° C. The preferred second temperature is in the range of about 30° C. to about 50° C., more preferably about 35° C. to about 45° C. and still more preferably about 40° C. The first pressure is preferably in the range of about 120 psi. to about 190 psi., more preferably about 142 psi. to about 170 psi., and still more preferably about 142 psi. The second pressure is preferably in the range of about 320 psi. to about 390 psi., more preferably about 341 to about 370 psi., and still more preferably about 341 psi.

The present process may be employed by passing the sheet through the first and second pair of embossing-counter rollers at rates used in conventional calendering systems, e.g., about 10 yards per minute to about 50 yards per minute.

BRIEF DESCRIPTION OF THE DRAWING

These and other aspects and advantages of the present invention are set forth in the following claims. Certain of these aspects and advantages are illustrated in the following description, particularly when considered in conjunction with the accompanying drawing in which like parts bear like reference numerals.

The drawing is a schematic illustration of an apparatus for carrying out the process of the present invention.

DESCRIPTION OF THE PREFERRED EMBODIMENT

Referring now to the drawing, a calendering/embossing apparatus, shown generally at 10, is illustrated. Apparatus 10 includes a molten polymer 12, heated calender rollers 14, 16, 18 and 20, first embossing roller 22, first back-up (counter) roller 24, second embossing roller 26, second back-up (counter) roller 28, a first series of cooling rollers designated as A, a second series of cooling rollers designated as B, and a series of finishing rollers designated as C.

The functioning of apparatus 10 is illustrated by processing a polyvinyl chloride (PVC) sheet 30. This PVC sheet is made of vinyl chloride polymer, with standard amounts of dioctyl phthalate as plasticizer, a conventional lubricant and a barium/cadmium stabilizer.

A quantity of this polymer formulation 12 in a heated moldable state, is passed through a series of flat openings between heated calender rollers 14, 16, 18 and 20 which action forces the polymer into a flat sheet. Heated calender rollers 14, 16, 18 and 20 are heated using conventional means. Heated calender rollers 14, 16, 18 and 20 are maintained at such temperatures that the polymer sheet leaving heated calender roller 20 has a temperature of 174° C.

Both first embossing roller 22 and first back-up roller 24 are cooled using conventional means to a temperature of 75° C. ± 5° C. First embossing roller 22 is appropriately engraved to provide the desired embossed pattern onto the first side 32 of sheet 30. The pressure between first embossing roller 22 and first back-up roller 24 is about 150 psi. Both second embossing roller 26 and second back-up roller 28 are cooled using conventional means to a temperature of 40° C. ±5° C. Second embossing roller 26 is appropriately engraved to provide the desired embossed pattern onto the second side 34 of sheet 30. The pressure between second embossing roller 26 and second back-up roller 28 is about 350 psi. The distance between the first nip 36 and the second nip 38 is 25 inches. These process conditions or parameters have been found to provide the desired embossing onto both first side 32 and second side 34 of sheet 30.

The back-up rollers 24 and 28 are generally made of rubber which can vary in durometer depending on the needs of the desired end product. The embossing rollers 22 and 26 are generally engraved metal (steel) rollers which are inscribed to a depth dictated by end needs.

After being doubly embossed, as described above, sheet 30 travels, at the rate of about 25 yards per minute, passes through two series of cooling rollers A and B (cooled by conventional means) which sets sheet 30 at its desired thickness and makes the embossing permanent. Sheet 30 then passes to a series of finishing rollers C and is sent for further finishing, e.g., printing, etc.

While this invention has been described with respect to various specific embodiments and examples, it is to be understood that the invention is not limited thereto and that it can be variously practiced within the scope of the following claims.

What is claimed is:

1. A process for embossing both mutually opposing first and second sides of a sheet of thermoplastic material comprising:
   (a) forming an embossable sheet of thermoplastic material at a temperature such that both mutally opposing first and second sides of said embossable sheet of thermoplastic material are capable of being embossed;
   (b) passing said embossable sheet of thermoplastic material between a first pair of embossing-counter rollers maintained at a first temperature with a first pressure between said first embossing roller and said first counter roller thereby embossing the said first side of said embossable sheet of thermoplastic material; and thereafter;
   (c) passing said embossable sheet of thermoplastic material between a second pair of embossing-counter rollers maintained at a second temperature with a second pressure between said second embossing roller and said second counter roller thereby embossing said second side of said embossable sheet of thermoplastic material, provided that said first temperature is greater that said second temperature and said first pressure is less than said second pressure.

2. The process of claim 1 wherein the embossing on said first side of said embossable sheet of thermoplastic material is not undesirably altered in step (c).

3. The process of claim 1 which further comprises (d) cooling the sheet of thermoplastic material from step (c).

4. The proces of claim 1 wherein said first and second pair of embossing-counter rollers are located in close proximity to minimize the temperature loss of said embossable sheet of thermoplastic material as it moves from step (b) to step (c).

5. The process of claim 1 wherein step (a) comprises passing the thermoplastic material through a series of flat openings between heated rollers.

6. The process of claim 1 wherein said the thermoplastic material comprises a polymer made from vinyl chloride.

7. The process of claim 6 wherein said first temperature is in the range of about 60° C. to about 90° C.

8. The process of claim 6 wherein said first pressure is in the range of about 120 psi. to about 190 psi.

9. The process of claim 6 wherein said second temperature is in the range of about 30° C. to about 50° C.

10. The process of claim 6 wherein said second pressure is in the range of about 320 psi. to about 390 psi.

11. The process of claim 6 wherein said first temperature is in the range of about 70° C. to about 80° C., said first pressure is in the range of about 142 psi. to about 170 psi., said second temperature is in the range of about 35° C. to about 45° C., and said second pressure is in the range of about 341 psi. to about 370 psi.

12. The process of claim 11 wherein said first temperature is about 75° C. and said second temperature is about 40° C.

13. The process of claim 4 wherein the distance between the point at which said first side is embossed and the point at which said second side is embossed is in the range of about 12 inches to about 50 inches.

14. The process of claim 13 wherein said distance is in the range of about 20 inches to about 30 inches.

15. The process of claim 14 wherein said distance is about 25 inches.

16. The process of claim 11 wherein the distance between the point at which said first side is embossed and the point at which said second side is embossed is in the range of about 12 inches to about 50 inches.

17. The process of claim 16 wherein said distance is in the range of about 20 inches to about 30 inches.

18. The process of claim 16 wherein said distance is about 25 inches.

* * * * *